J. Shearer.
Horse Hay Fork.
Nº 71334
Patented Nov. 26, 1867.
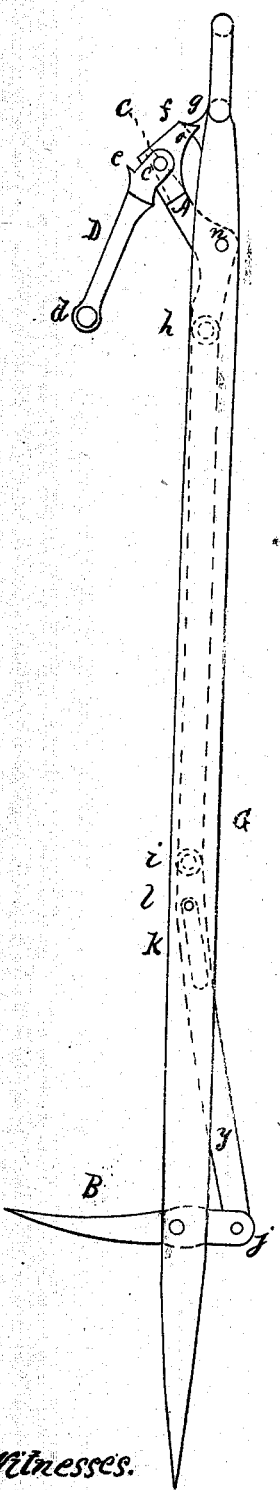
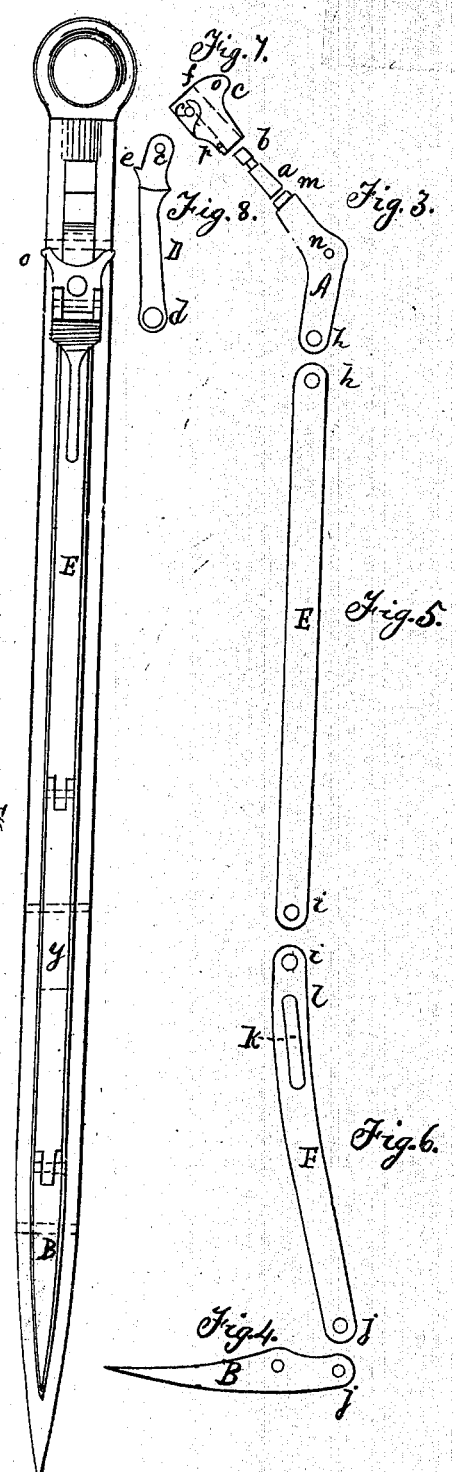
Witnesses.
Peter Shearer
H. R. Hill
Inventor
Joseph Shearer

United States Patent Office.

JOSEPH SHEARER, OF READING, PENNSYLVANIA.

Letters Patent No. 71,334, dated November 26, 1867.

---

IMPROVEMENT IN HORSE HAY-FORKS.

---

The Schedule referred to in these Letters Patent and making part of the same.

---

TO ALL WHOM IT MAY CONCERN:

Be it known that I, JOSEPH SHEARER, of the city of Reading, in the county of Berks, and State of Pennsylvania, have invented a new and useful Improvement on Hay-Forks operated by Horses; and I do hereby declare that the following is a full, clear, and exact description of the construction and operation of the same, reference being had to the annexed drawings, making a part of this specification, in which—

Figure 1 is a side view of the fork in a vertical position. This is the position of the fork at the time the burden is suspended.

Figure 2 is a front view of the fork in a vertical position. This is the position of the fork and its parts after the burden is released.

Figure 3 is a side view of the lever A, employed to control the hook B on which the burden is suspended.

Figure 4 is a view of the hook B.

Figures 5 and 6 are links which connect the lever A and hook B.

Figure 7 is a view of the swivel C attached to the lever A.

Figure 8 is a view of the arm D attached to the swivel C.

Similar letters refer to corresponding parts in the different figures.

The object of this invention is to construct the fork in such a manner that the substance to be removed can be discharged or disengaged from the hook with ease and certainty, in any position, after being elevated to the desired place, and also to secure the substance with facility, by throwing out the hook, after the tine has penetrated it.

The lever A has a conical extension of the upper end, around which revolves the swivel C. In this conical extension are cut two grooves, $b$ and $m$, fig. 3, in which the pins $c$ and $p$, fig. 7, revolve, in order to hold the swivel in its place. The pin $c$ also attaches the arm D to the swivel C, as is shown in fig. 1. The arm D turns vertically on the pin $c$, and has a notch or protection, $e$, which arrests its upward motion as it comes in contact with the head of the swivel C at $f$. The arm D thereby becomes a prolongation of the lever A, and is used as a handle for the purpose of raising and depressing the lever in operating the hook B. A hole, $d$, is pierced through the end of the arm D, in which the rope whereby the arm D is operated in discharging the load, is secured. On the upper end of the fork, opposite to and facing the side of the swivel C, there is a projection, $g$, which fits in a corresponding cavity or notch, $o$, in a projection on the side of the swivel C.

The object of this contrivance is to cause the lever A to be pushed down far enough to throw the apparatus out of gear, when the swivel C is turned in any direction, by means of the rope attached to the arm D. The hook B will then be drawn down by the weight of the object which it supports, and the object will fall. The burden will therefore be discharged with certainty and ease, in every position of the fork. If the pull upon the rope is downward, the lever A will be drawn down directly, and if the pull is lateral, the lever will be pushed down by means of the cavity in the side of the swivel and the projection $g$ on the upper end of the prong of the fork.

The link E connects the lever A with the link F, as is shown in fig. 1, by means of pins inserted in the holes $h$ and $i$. The link F is connected with the hook B by a pin through the hole $j$. A slot, $k$, is cut lengthwise through the link F, as is shown in fig. 6. A pin, $l$, fig. 1, fixed in the sides of the tine G runs through the slot $k$, holding the link F in its place, and causing it to work vertically. This slot also causes a lateral motion at the joint $j$, because, as the link E is pushed down, the joint $i$ moves a little to the left, throwing the lower part of the link F to the right; therefore, when the apparatus is in the position indicated by fig. 2, the motion of the lever A takes full and immediate effect upon the hook B, by pressing the joint $j$ to the right. There is therefore no strain on the parts by starting the hook after the tine has penetrated the object to be elevated. By reason of the free and easy motion of the links, caused by the partial lateral pressure, the lower link may be set entirely inside of the space between the sides of the tine G, so as to offer no resistance when the tine is thrust into the substance to be elevated.

Disclaiming all other parts of the fork, I claim as my invention, and desire to secure by Letters Patent—

The swivel C, in combination with the lever A, and operated by the arm D, substantially as described.

JOSEPH SHEARER.

Witnesses:
PETER SHEARER,
H. R. HILL.